W. MAIN.
SETTLING CONE.
APPLICATION FILED MAR. 1, 1912.
1,065,542.
Patented June 24, 1913.
2 SHEETS—SHEET 2.
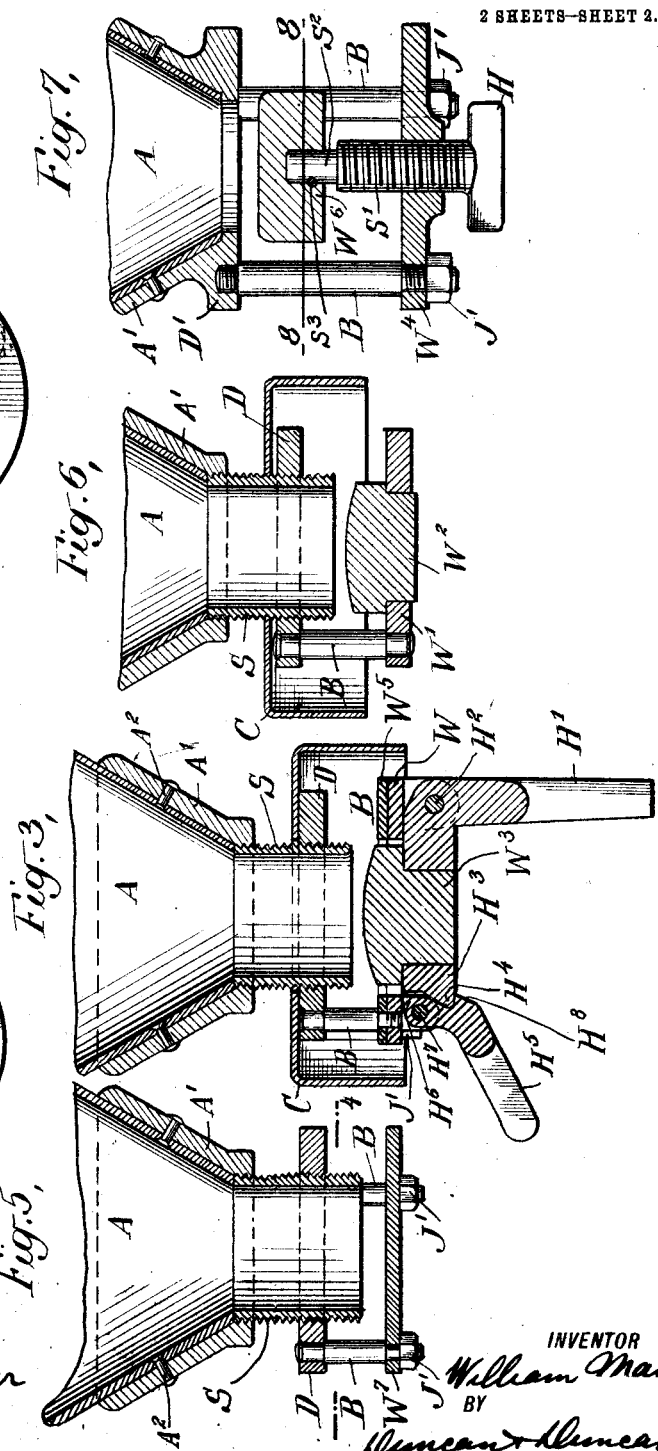
WITNESSES
Albert E. Thayer
Charles Eberhart
INVENTOR
William Main
BY
Duncan & Duncan
ATTORNEYS

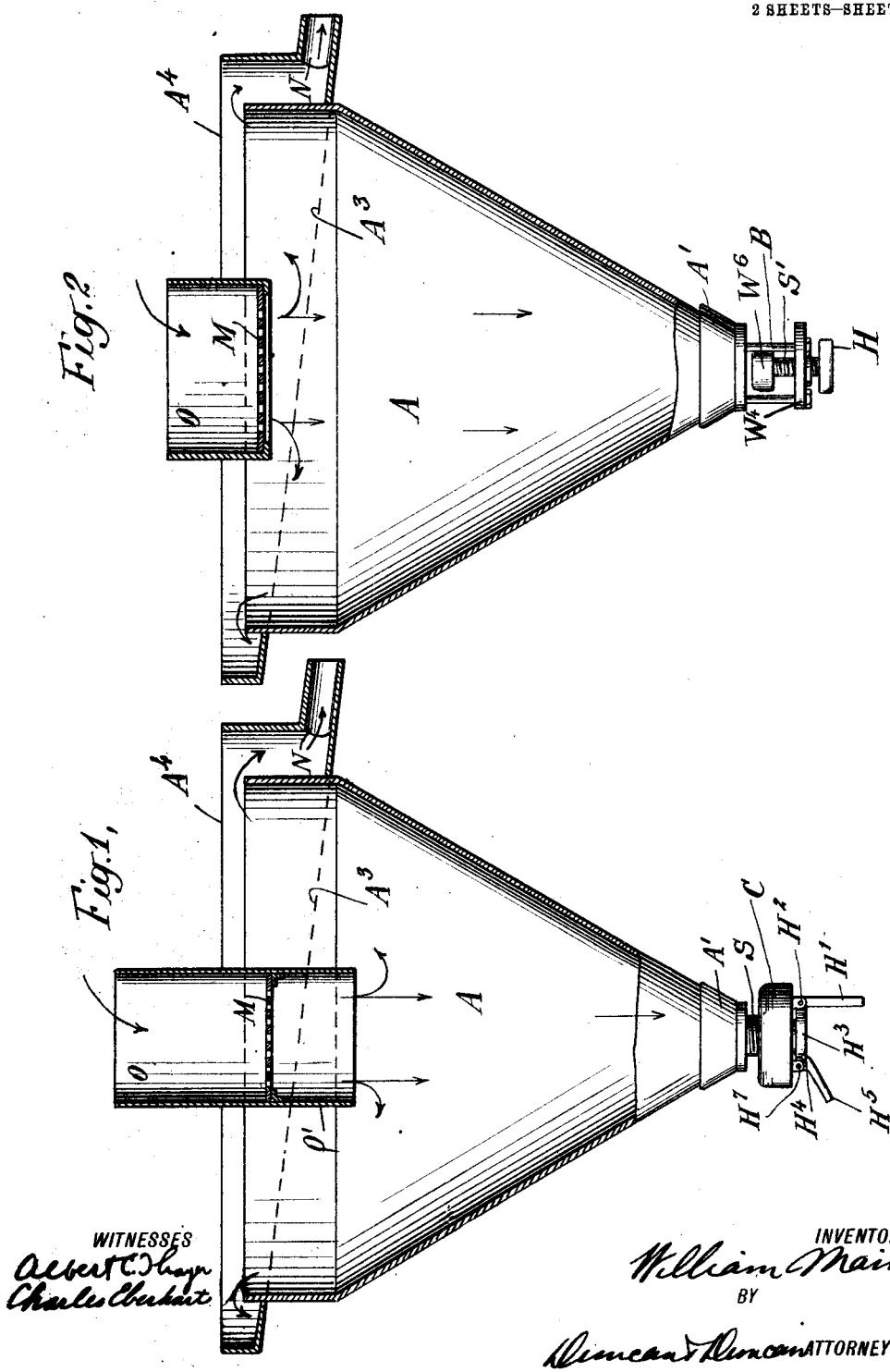

UNITED STATES PATENT OFFICE.

WILLIAM MAIN, OF PIERMONT, NEW YORK.

SETTLING-CONE.

1,065,542.

Specification of Letters Patent.   Patented June 24, 1913.

Application filed March 1, 1912. Serial No. 680,991.

*To all whom it may concern:*

Be it known that I, WILLIAM MAIN, citizen of the United States, and resident of Piermont, Rockland county, New York, have made certain new and useful Inventions Relating to Settling-Cones, of which the following is a specification, taken in connection with the accompanying drawings.

This invention relates especially to settling cones or deep settling ore classifiers in which a suitably hoppered settling chamber is provided with a distributing device to supply the fine water suspended material thereto, the finer particles being carried off by an overflow connected with the upper part of the chamber. The larger and heavier particles settle down through the chamber toward its throat which may be provided with an exterior thread and with a coöperating adjusting nut serving to support a valve plate detachably connected thereto and thus provide an annular discharge aperture around the throat to allow the substantially uniform radial discharge of the more solid material therefrom. A replaceable valve block may be mounted on the valve plate to form the discharge orifice and may be releasably mounted in a pivoted or other frame so as to effect emergency release and give free access to the throat in case of clogging.

In the illustrative embodiments of this invention shown in the drawings, Figure 1 is a side elevation partly in section of one form of classifier, Fig. 2 is a similar view of another form, Fig. 3 is an enlarged sectional view of the discharge throat and coöperating parts of the classifier shown in Fig. 1, Fig. 4 is a horizontal section along the line 4—4 of Fig. 5 which shows in vertical section another discharge valve arrangement, Fig. 6 is a vertical section through still another adjustable discharge valve device, Fig. 7 shows in enlarged vertical section the form of discharge valve device of Fig. 2 and Fig. 8 is a horizontal section thereof taken along the line 8—8 of Fig. 7.

In the illustrative form of classifier shown in Figs. 1 and 3, the hoppered settling chamber A may be of any suitable form and material, and may for convenience be made of sheet metal in substantially conical form and provided at its lower end with a suitable reinforcing collar $A^1$ connected thereto in any desired way as by the rivets $A^2$, and also with a suitable nipple such as S which may be exteriorly threaded and form the discharge throat for the chamber. The upper part of the settling chamber may have installed in connection therewith a suitable launder or overflow trough such as $A^4$ the lower portion $A^3$ of which is preferably inclined so as to direct the overflow received from any suitable overflow openings in the upper part of the chamber through a suitable overflow discharge such as N. Any suitable distributing device or box O may be installed in connection with the settling chamber and provided, if desired, with a coarse mesh screen M so as to separate large lumps of material and properly distribute the water and suspended matter supplied to the chamber, the box having, if desired, the depending portion $O^1$ below the screen to assist in downwardly directing the material. This material may be mixed sands, slimes or other material suspended in a large amount of water and delivered for instance, from various reducing machinery, such as stamps, by which the wet crushing of ores and minerals is effected. The material supplied to the classifier may contain as much as eighty-five to ninety per cent. of water which retains in suspension and carri s off over the upper edge of the classifier i to the overflow, for instance, the lighter particles, while the coarser and heavier parti les settle rapidly and while still suspended or incorporated in a relatively smaller proportion of water may be discharged through the lower discharge throat with which a valve of any desired description may coöperate so as to preferably form an annular discharge orifice of adjustable size around the throat through which the coarser material, containing thirty per cent. or so of water may be substantially uniformly discharged in a radial direction. Under normal conditions the heavier particles form a somewhat compact mass resembling quick-sand, below the strong currents in the upper part of the chamber and if the discharge of the coarser material from the lower discharge throat decreases for any reason, such as clogging, the heavier particles tend to form a compact, firm mass which must be removed before the regular operation of the classifier can continue. In order to secure the maximum thickening effect or the maximum removal of water from the coarser particles the classifier must be operated under these somewhat unstable conditions, the coarser material in the lower part of the settling chamber constituting practically a quicksand which must regularly settle and be discharged since if stagnation occurs, for even a short time, firm sand banks are liable to form and clog the apparatus. The thickened sand or pulp should slide uniformly down the inner surface of the settling chamber which should be free from obstructions or partitions for this reason and also to facilitate cleaning in case clogging occurs.

The valve may be mounted in connection with the discharge throat in any desired way, as by providing a suitable adjusting nut D somewhat loosely coöperating with the threads of the discharge throat and supporting a series of spaced connectors B which may have their upper ends connected to the nut as by riveting them thereto. The lower ends of these connectors are preferably detachably connected with a suitable valve plate W and this may be conveniently accomplished by passing the threaded lower ends of the connectors through suitable holes in the valve plate and securing the plate to the connectors by nuts such as $J^1$. If desired, the valve may be releasably mounted in connection with the discharge throat by mounting the removable valve block $W^3$ in the frame $H^3$ which may be mounted on the valve plate W in any desired way as by the pivot pin $H^2$ passing through the frame and suitable depending lugs of the valve plate. Any means such as the depending operating handle $H^1$ connected to the frame may bring the frame and valve block into the operating position shown in Fig. 3 and any disengageable means such as the pivoted latch $H^5$ may be used to hold the valve in this normal position. The latch may be pivoted about the pin $H^7$ in suitable depending lugs on the valve plate and may be provided with a suitable heel or projection $H^6$ adapted to coöperate with the valve plate and prevent the undesirable inward swinging of the latch. On releasing this latch the valve and frame are released and swing downward thus giving free upward access to the throat and in case of clogging a bar or other cleaning instrument such as a water nozzle may be inserted into the throat and quickly clear the same so as to restore the classifier to normal operating condition. When the valve block is swung upward into operating position by the handle $H^1$, the inclined lug $H^4$ engages the inclined portion $H^8$ of the latch and swings it upward so as to allow the parts to come into locking engagement firmly holding the valve block in position and providing an annular discharge orifice from which the thickened pulp may be substantially uniformly radially discharged from the throat of the deep settling classifier. The size of this annular discharge orifice may, of course, be readily adjusted by turning the adjusting nut D and connected parts to the desired extent which can be effected during operation, if desired, and the somewhat loose mounting of the valve effected in this way makes it possible for the operator to move or shake the valve as by shaking the operating handle so as to promote the discharge of the material when it tends to clog. The coarse particles tend to wear away the valve block $W^3$ which may be removed and replaced by a new block from time to time and for similar reasons a suitable replaceable wearing washer $W^5$ may be interposed above the valve plate W. If desired, also a suitable splash cap C may be provided and conveniently mounted in connection with the discharge orifice by loosely suspending it upon the threaded throat S so that it can be lifted to the desired extent to allow inspection of the parts when desirable. For some purposes a simpler form of valve is desirable as for instance, in case of breakage of the pivoted frame or any of the connected parts, a round flat plate such as $W^7$ may be bolted directly to the connectors by the nuts $J^1$ as shown in Fig. 5 so that the classifier may be maintained in operation with such facilities as are readily secured even under mining camp conditions. Fig. 6 shows another form of valve device in which the connectors may be riveted to the valve plate $W^1$ in which the detachable valve block $W^2$ may be mounted so as to be held in coöperation with the discharge throat and form an annular discharge orifice of the desired size therewith.

Fig. 2 shows a distributing device of somewhat different construction and as shown more in detail in Figs. 7 and 8 the valve may in this instance be in the form of a valve block $W^4$ held by suitable means such as the pin $S^3$ upon the end $S^2$ of the adjusting screw $S^1$ which is indicated as having threaded engagement with the valve plate $W^4$. This valve plate may be mounted in any desired way in connection with the discharge throat as by the nuts $J^1$ which secure it to suitable connectors B which may be screwed or otherwise connected to a flange such as $D^1$ on the reinforcing collar $A^1$ for instance. By turning the handle H of the screw $S^1$ the valve block is adjusted with respect to the discharge throat and an annular discharge orifice of the desired size secured.

Having described this invention in connection with a number of illustrative embodiments, forms, proportions, materials and arrangements of parts, to the details of which disclosure the invention is not of course to be limited, what is claimed as new and what is desired to be secured by Letters Patent is set forth in the appended claims.

1. In deep settling ore classifiers, a hoppered settling chamber, a distributing device to supply material thereto, an overflow coöperating with said settling chamber, an exteriorly threaded discharge throat at the lower end of said settling chamber, an adjusting nut coöperating with the thread on said throat, a series of spaced connectors on said nut, a valve plate detachably secured to said connectors, a pivoted frame mounted on said valve plate and having a downwardly projecting operating handle, a replaceable valve block mounted in said frame to normally coöperate with said throat and a pivoted latch coöperating with said frame to normally and releasably hold said block in operative position and form an annular discharge orifice around said throat and allow the emergency release of said block and frame to give free access to said throat.

2. In deep settling ore classifiers, a settling chamber, a distributing device to supply material thereto, an overflow coöperating with said settling chamber, threaded adjusting means on said settling chamber, a discharge throat at the lower end of said settling chamber, an adjusting nut coöperating with the threaded means on said settling chamber, a series of spaced connectors on said nut, a valve plate secured to said connectors, a pivoted frame mounted on said valve plate and having a projecting operating handle, a valve block in said frame to normally coöperate with said throat and a latch coöperating with said frame to normally and releasably hold said block in operative position and form a discharge orifice for said throat and allow the emergency release of said block and frame to give free access upward to said throat.

3. In deep settling ore classifiers, a hoppered settling chamber, an upper discharge therefor, coöperating supplying means for supplying fine material suspended in water to the upper part of said settling chamber, a discharge throat adjacent the lower end of said settling chamber to which material from said supplying means has unobstructed access while undisturbedly settling, a valve device coöperating with said throat to form a normally constant annular orifice to effect the substantially uniform radially outward discharge of the more solid material from said throat and releasing means to manually effect the instantaneous emergency release of said valve device.

4. In deep settling ore classifiers, a hoppered settling chamber, an upper discharge therefor, coöperating means for supplying fine material suspended in water to said settling chamber, a discharge throat adjacent the lower end of said settling chamber, a loosely mounted valve device coöperating with said throat to form an annular orifice for the discharge of the more solid material from said throat and means to manually shake said valve device during operation to promote discharge of material therefrom.

WILLIAM MAIN.

Witnesses:
HARRY L. DUNCAN,
JESSIE B. KAY.